United States Patent
Ooyama

(10) Patent No.: US 8,334,064 B2
(45) Date of Patent: Dec. 18, 2012

(54) BATTERY RECEIVING MECHANISM

(75) Inventor: Kazuhiko Ooyama, Hyogo (JP)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 12/529,642

(22) PCT Filed: Mar. 21, 2008

(86) PCT No.: PCT/JP2008/000667
§ 371 (c)(1),
(2), (4) Date: Sep. 2, 2009

(87) PCT Pub. No.: WO2008/129805
PCT Pub. Date: Oct. 30, 2008

(65) Prior Publication Data
US 2010/0062324 A1   Mar. 11, 2010

(30) Foreign Application Priority Data
Mar. 30, 2007   (JP) .................................. 2007-093275

(51) Int. Cl.
*H01M 2/10* (2006.01)

(52) U.S. Cl. .......................................... 429/97; 429/100

(58) Field of Classification Search .................... 429/96, 429/99, 100, 97
See application file for complete search history.

(56) References Cited

U.S. PATENT DOCUMENTS

| 4,957,831 | A | * | 9/1990 | Meredith et al. | 429/97 X |
| 5,135,822 | A | * | 8/1992 | Okamoto | 429/97 |
| 5,206,098 | A | * | 4/1993 | Cho et al. | 429/96 |
| 7,442,464 | B2 | * | 10/2008 | Li | 429/97 |

FOREIGN PATENT DOCUMENTS

| JP | 2000-133963 | 5/2000 |
| JP | 2001-084975 | 3/2001 |
| JP | 2006-344537 | 12/2006 |

* cited by examiner

*Primary Examiner* — Stephen J. Kalafut
(74) *Attorney, Agent, or Firm* — McDermott Will & Emery LLP

(57) ABSTRACT

In a battery receiving mechanism in which one end of a casing for receiving a battery has an opening section for exposing an electrode of a battery and this opening section is opened and closed by a cover, the cover is divided to an outer section and an inner section sliding to each other and the outer section is connected to a casing by a hinge having a long hole. The inner section has a part engaged with the casing. When the cover is opened, the cover can be opened with a short stroke without rubbing the battery.

7 Claims, 12 Drawing Sheets

BATTERY RECEIVING MECHANISM

RELATED APPLICATIONS

This application is the U.S. National Phase under 35 U.S.C. §371 of International Application No. PCT/JP2008/000667, filed on Mar. 21, 2008, which in turn claims the benefit of Japanese Application No. 2007-093275, filed on Mar. 30, 2007, the disclosures of which Applications are incorporated by reference herein.

TECHNICAL FIELD

The present invention relates to a battery receiving mechanism provided in a mobile or desktop electronic device for example. In particular, the present invention relates to a battery receiving mechanism in which an opening section provided at one end of a casing forming a battery receiving room is closed and opened by a cover.

BACKGROUND ART

Various battery receiving mechanisms provided in mobile or desktop electronic devices for example have been provided. The following section will describe the first conventional example and the second conventional example in which one end of a casing forming a battery receiving room has an opening section and this opening section is opened and closed by a rotatably-moving cover.

The first conventional example of a battery receiving mechanism is shown in FIG. 7 to FIG. 9. FIG. 7 is a front cross-sectional view illustrating when the cover of the battery receiving mechanism is closed in the first conventional example. FIG. 8 is a front cross-sectional view illustrating when the cover is being opened. FIG. 9 is a front cross-sectional view illustrating when the cover is opened. As shown in FIG. 7 to FIG. 9, battery receiving room 2 for receiving battery 1 is formed in casing 10 and one end of casing 10 (upper end in the drawings) has opening section 11 at which electrode 1a of battery 1 is exposed. Opening section 11 can be opened and closed by cover 20. At an inner depth of battery receiving room 2, terminal 3 joined to electrode 1a of battery 1 is fixed to terminal 3.

Opening section 11-side of casing 10 has collar sections 12 and 13. Collar section 12 is continued to uneven section 14 that is fixed to body case 4. By uneven section 14, the surface of cover 20 when opening section 11 is closed is in the same plane as the surface of body case 4. Collar section 12 of casing 10 is connected to a base end section of cover 20 (right end of outer section 22 in FIG. 7) via hinge 30. Hinge 30 is obtained by connecting a washer (not shown) fixed to collar section 12 of casing 10 to a washer fixed to a back face of cover 20 by an axis and allows cover 20 to be rotatably moved.

Cover 20 is obtained by superposing inner section 21 having a base end section connected by hinge 30 with outer section 22 slid on inner section 21 so that the former and the latter cannot be separated from each other. When outer section 22 is slid in a direction along which outer section 22 is moved away from uneven section 14 of casing 10, a space is provided between the base end section of outer section 22 and uneven section 14 of casing 10. FIG. 8 illustrates when outer section 22 is slid in the left direction in the drawing and a space is provided between outer section 22 and uneven section 14. Then, as shown in FIG. 9, cover 20 can be rotated around hinge 30 to have a standing posture and can be opened. In FIG. 7, a tip end of outer section 22 has, in order to maintain the status where the cover is closed, hook 21a locked to collar section 13 of casing 10. On the other hand, inner section 21 is fixed to terminal 23 that is joined, when the cover is closed, to electrode 1a of battery 1 in battery receiving room 2.

In the battery receiving mechanism as described above, when the cover is closed, hook 21a provided at outer section 22 of cover 20 is locked to collar section 13 of casing 10, cover 20 maintains the lie-down posture, and terminal 3 and terminal 23 are securely abutted to electrode 1a of battery 1. In order to open the cover, outer section 22 of cover 20 is slid. Then, terminal 23 fixed to inner section 21 of cover 20 maintains the status where terminal 23 is abutted to electrode 1a of battery 1 and is prevented from being rubbed against electrode 1a of battery 1. Then, the base end section of outer section 22 is moved away from uneven section 14 of casing 10 to thereby provide a space therebetween. This allows cover 20 to have a standing posture and the cover can be opened.

Next, the second conventional example of the battery receiving mechanism will be described with reference to FIG. 10 to FIG. 12. However, the same parts as those of the first conventional example are denoted with the reference numerals and will be described further. FIG. 10 is a front cross-sectional view illustrating the battery receiving mechanism in the second conventional example when the cover is closed. FIG. 11 is a front cross-sectional view illustrating the battery receiving mechanism in the second conventional example when the cover is being opened. FIG. 12 is a front cross-sectional view illustrating the battery receiving mechanism in the second conventional example when the cover is opened.

As in the first conventional example, this battery receiving mechanism is also structured so that one end (an upper end section in the drawings) has casing 10 having opening section 11 and cover 40 that is used to open and close opening section 11 and that has a back face fixed to terminal 43. The battery receiving mechanism is also structured so that collar section 12 and the base end section of cover 40 provided at opening section 11-side of casing 10 are connected via hinge 50, thereby allowing the cover to be rotatably moved to have the lie-down posture and the standing posture.

Unlike the first conventional example, hinge 50 includes fixing section 52 having long hole 51 therein and shaft 53 moving within long hole 51. Fixing section 52 is fixed to collar section 12 of casing 10. Shaft 53 is fixed to the base end section of cover 40. Thus, cover 40 can be slid by a distance equal to the length of long hole 51. Both sides of the base end section of cover 40 have notch 41 to which fixing section 52 of hinge 50 is inserted. The tip end of cover 40 has hook 40a locked to collar section 13 of casing 10.

In the case of the battery receiving mechanism as described above, the cover-closed status is maintained, as shown in FIG. 10, when cover 40 is in the lie-down posture and hook 40a provided in cover 40 is locked to collar section 13 of casing 10 and each of terminals 43 is securely abutted to electrode 1a of battery 1. Then, as shown in FIG. 11, in order to open the cover, cover 40 is slid. At the same time, terminal 43 fixed to cover 40 is also slid while being rubbed against electrode 1a of battery 1. Then, as shown in FIG. 12, the base end section of cover 40 is moved away from uneven section 14 of casing 10 to provide a space therebetween to thereby allow the cover 40 to have the standing posture and thus the cover can be opened. This second conventional example is superior to the first conventional example in that a stroke required to slide cover 40 is short. The reason of the short stroke is that, when the cover is opened, cover 40 is prevented from going over body case 4 and thus the stroke length can be determined, regardless of the thickness of body case 4, only based on the shape of cover 40 and the shape of hinge 50.

A battery retention apparatus having the same configuration as that of the first conventional example is disclosed in Patent Publication 1. A battery receiving room structure having the same configuration as that of the second conventional example is disclosed in Patent Publication 2.

In the case of battery receiving mechanism in the first conventional example, the cover is opened by sliding outer section 22 of cover 20. However, the space provided when the base end section of outer section 22 of cover 20 is moved away from uneven section 14 of casing 10 must be equal or longer than the thickness obtained by adding uneven section 14 of casing 10 to body case 4. Due to this, the sliding distance of outer section 22 of cover 20 is longer than that of the battery receiving mechanism in the second conventional example. Thus, it cannot be said that cover 20 can be opened and closed with good operability. Cover 20 is structured so that inner section 21 is connected to hinge 30 so as to allow cover 20 to be rotatably moved t have the lie-down posture and the standing posture. Thus, inner section 21 requires such a rigidity that prevents inner section 21 from being broken even when inner section 21 receives a load when the cover is opened or closed. So, inner section 21 is made of stainless steel for example. However, stainless steel is high-cost and thus a high cost is required for a battery receiving mechanism including stainless steel-made cover 20.

In the case of the battery receiving mechanism in the second conventional example on the other hand, when cover 40 is slid to open cover 40, terminal 43 fixed to cover 40 is slid while being rubbed against electrode 1a of battery 1. Although this design is superior n that cover 40 can have a simple structure, cover 40 cannot be smoothly slid because of the sliding friction resistance between terminal 43 and electrode 1a. In the case of a size AA battery on the other hand, BATTERY ASSOCIATION OF JAPAN recommends that a load of about 4.9 to 9.8 N is preferred as a force to press an electrode by a terminal per one battery. When four or more size AA batteries as described above are used, the above sliding friction resistance is excessively-high and thus a remarkably-high force is required to slide cover 40.

[Patent Publication 1] Japanese Patent Unexamined Publication No. 2000-133963
[Patent Publication 2] Japanese Patent Unexamined Publication No. 2006-344537

SUMMARY OF THE INVENTION

A battery receiving mechanism according to the present invention is structured so that one end of a casing having a battery receiving room has an opening section for exposing an electrode of a battery, the opening section is opened and closed by a cover, and the casing is connected to the cover via a hinge. Furthermore, the cover has an outer section and an inner section that are superposed to each other and that are slid. The inner section is abutted to the electrode of the battery. The outer section is connected to the hinge. The hinge has a shaft and a bearing and the bearing allows the shaft to be slid in a direction along which the cover is slid. Furthermore, the battery receiving mechanism has an engagement section for engaging the inner section with the casing when the cover is closed.

According to this battery receiving mechanism, the inner section is prevented from being slid when the cover is opened and closed. Thus, the electrode fixed to the inner section is prevented from being rubbed against the electrode of the battery in the battery receiving room and the outer section can be slid smoothly. Furthermore, the cover can be opened by merely sliding the outer section by the sliding distance equal to the length of the long hole formed in the hinge. Thus, the cover can be opened with good operability. Furthermore, this battery receiving mechanism does not use high-cost stainless steel for the cover and thus can realize cost reduction.

REFERENCE MARKS IN THE DRAWINGS

Figure 1:
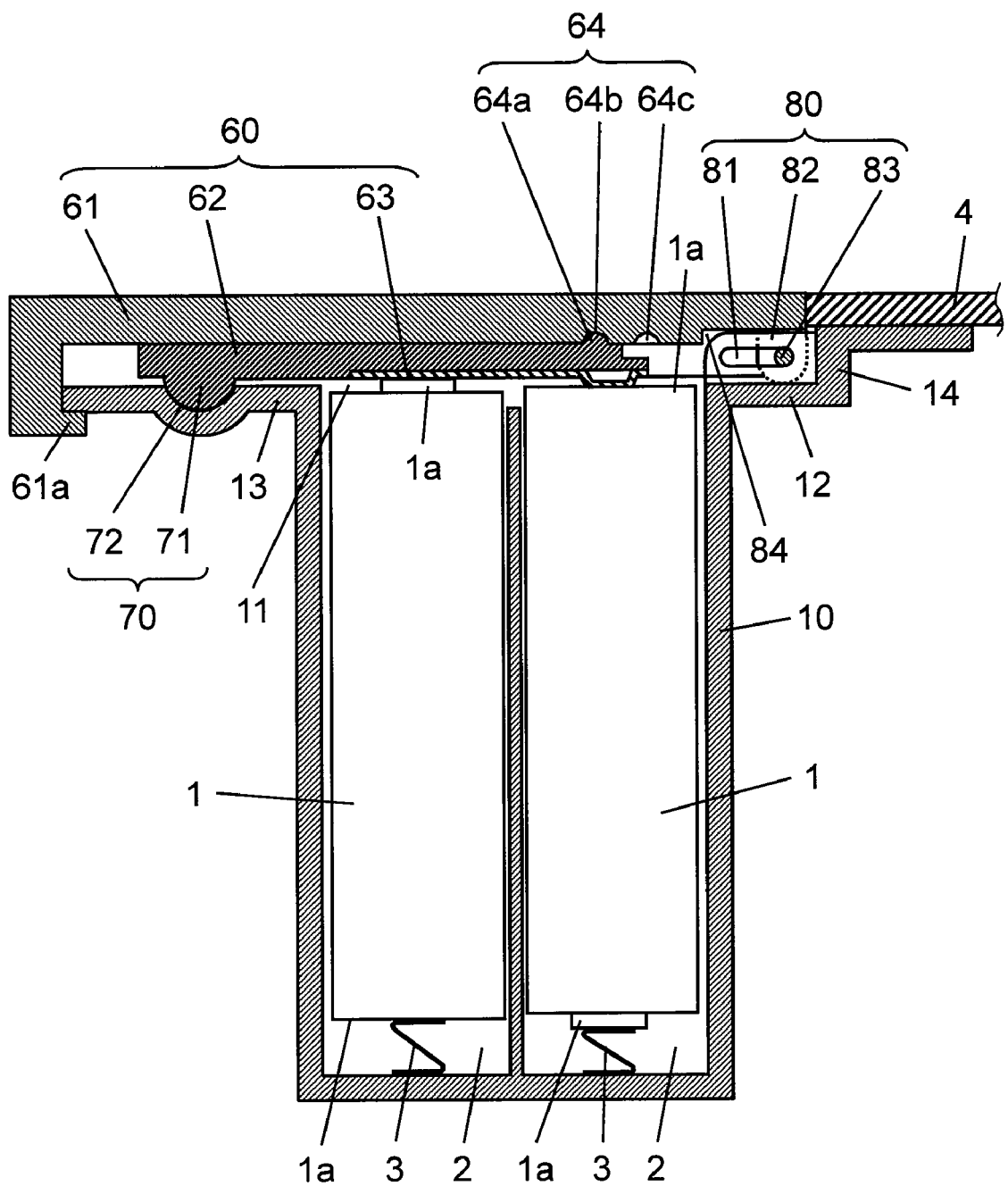
FIG. 1 is a front cross-sectional view illustrating a battery receiving mechanism in Embodiment 1 according to the present invention when the cover is closed.

1 Battery
1a Electrode
2 Battery receiving room
10 Casing
11 Opening section
20, 40, and 60 Cover
22 and 61 Outer section
21a, 40a, and 61a Hook
21 and 62 Inner section
3, 23, 43, and 63 Terminal
64 Lock section
64a Protrusion section
64b Small dent section
64c Small dent section
65 Lock section
65a Projection section
65b Biasing member
65c Retention section
70 Engagement section
71 Convex section
72 Concave section 30, 50, and 80 Hinge
51, 81 Long hole
52 and 82 Fixing section
53 and 83 Shaft

DETAILED DESCRIPTION OF PREFERRED EMBODIMENTS (Embodiment 1)

Figure 2:
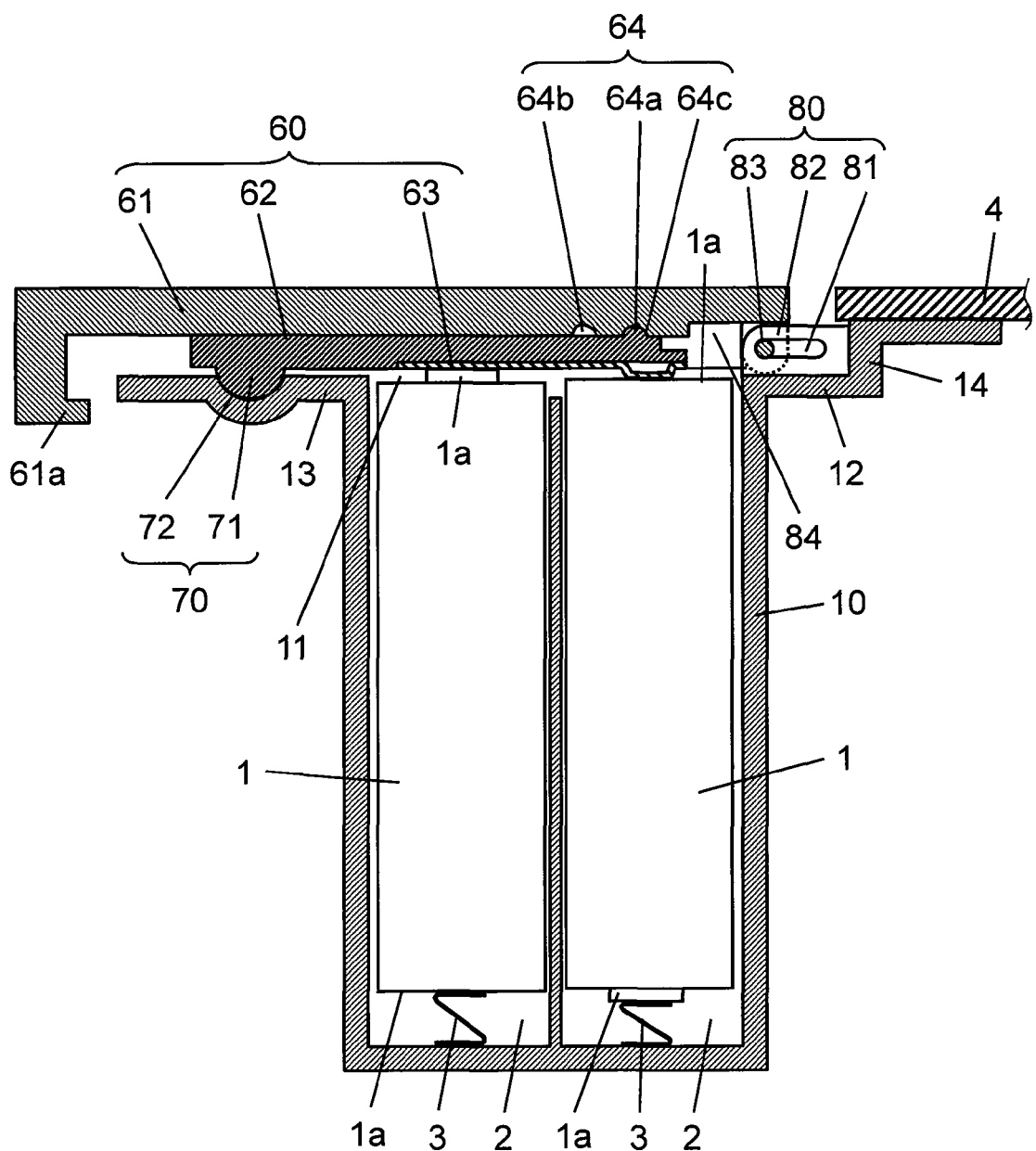
FIG. 2 is a front cross-sectional view illustrating the battery receiving mechanism in Embodiment 1 according to the present invention when the cover is being opened.
Figure 3:
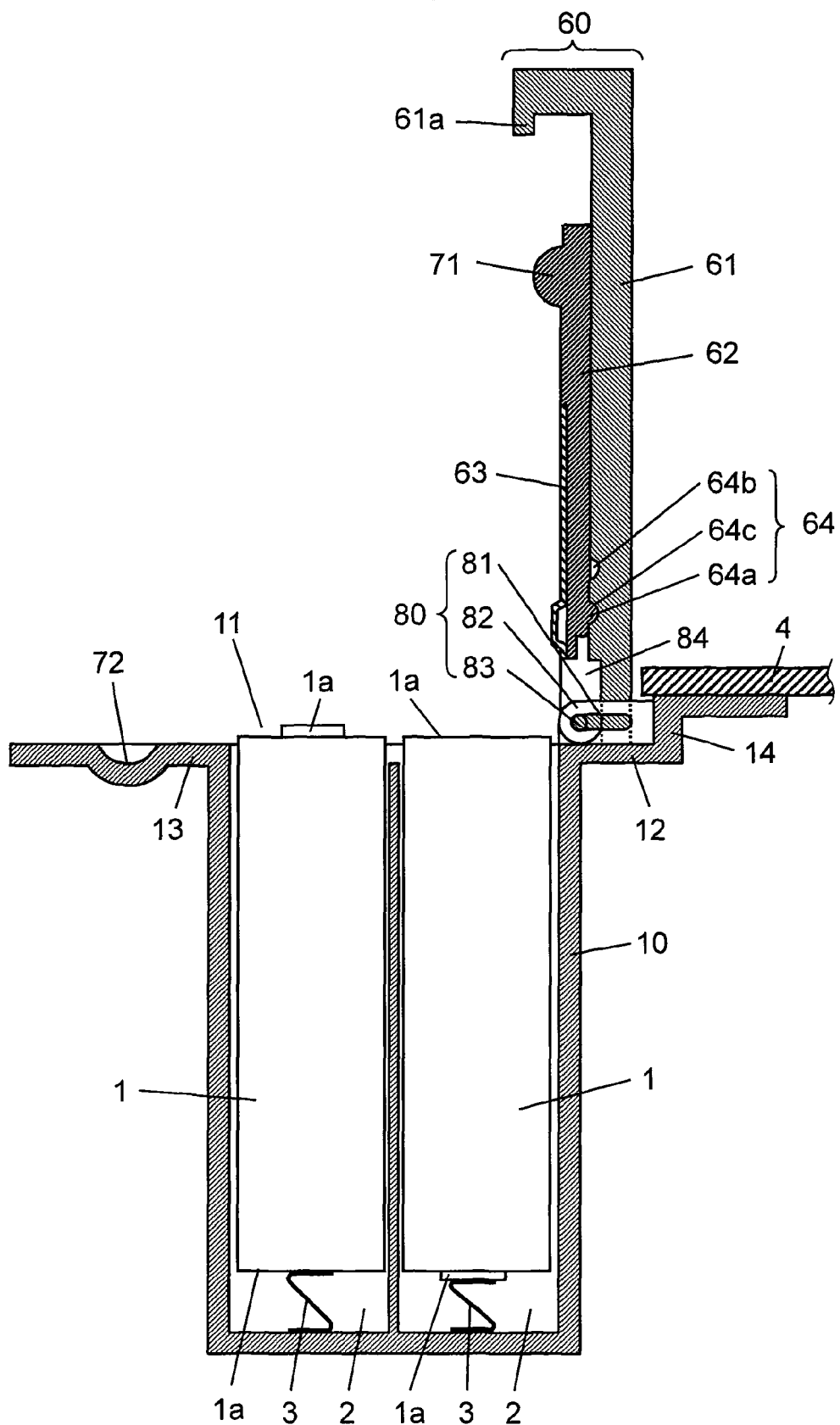
FIG. 3 is a front cross-sectional view illustrating the battery receiving mechanism in Embodiment 1 according to the present invention when the cover is opened.

The following section will describe Embodiment 1 of the battery receiving mechanism according to the present invention with reference to FIG. 1 to FIG. 3. The same parts as those of the conventional design are denoted with the same reference numerals and will not be described further. FIG. 1 is a front cross-sectional view illustrating the battery receiving mechanism in Embodiment 1 according to the present invention when the cover is closed. FIG. 2 is a front cross-sectional view illustrating the battery receiving mechanism when the cover is being opened. FIG. 3 is a front cross-sectional view illustrating the battery receiving mechanism when the cover is opened.

This battery receiving mechanism includes: casing 10 including opening section 11; cover 60 for opening and closing opening section 11; and hinge 80 for connecting casing 10 to cover 60. Casing 10 forms battery receiving room 2 and opening section 11-side has collar sections 12 and 13. Collar section 12 is continued to uneven section 14 and this part continued to uneven section 14 and body case 4 are fixed. At the bottom of battery receiving room 2, terminal 3 joined to electrode 1a of battery 1 is fixed to casing 10.

In the drawings, cover 60 is rotatably moved around hinge 80 as a supporting point to have a lie-down posture for blocking opening section 11 and a standing posture for opening opening section 11. Cover 60 is obtained by superposing outer section 61 slid in a direction orthogonal to the length direction of battery 1 in battery receiving room 2 and inner section 62 fixed to terminal 63 abutted to electrode 1a of battery 1 received in battery receiving room 2 so that the former cannot be separated from the latter. A face at which outer section 61 is opposed to inner section 62 has lock section 64. Lock section 64 is used, when the cover is opened and then is closed, to temporarily fix terminal 63 fixed to inner section 62 so that terminal 63 is joined to electrode 1a of battery 1. Lock section 64 is obtained by combining protrusion section 64a engaged and disengaged by sliding outer section 61 with small dent sections 64b and 64c. Small dent sections 64b and 64c are provided at two positions of a position closer to the tip end of outer section 61 and a position closer to the base end section (the right end of outer section 61 in FIG. 1). Protrusion section 64a is provided at one position in inner section 62. Protrusion section 64a is temporarily fixed by being engaged with small dent section 64b or being engaged with small dent section 64c. Small dent sections 64b and 64c at the two positions have therebetween an interval that is equal to the sliding distance of outer section 61. As shown in FIG. 1, when the cover is closed, protrusion section 64a is engaged with small dent section 64b closer to the tip end. When outer section 61 is being slid in order to open the cover as shown in FIG. 2 and when the cover is opened as shown in FIG. 3, protrusion section 64a is engaged with small dent section 64c closer to base end section. Alternatively, lock section 64 also may be provided, on the contrary to this embodiment, so that protrusion section 64a is provided in outer section 61 and small dent sections 64b and 64c are provided in inner section 62.

In order to realize an accurate positioning for allowing, in order to close cover 60, terminal 63 fixed to inner section 62 to be securely abutted to electrode 1a of battery 1, inner section 62 and collar section 13 of casing 10 have engagement section 70. Engagement section 70 are composed, in order to prevent outer section 61 from being disengaged during sliding, of convex section 71 and concave section 72 larger than protrusion section 64a and small dent sections 64b and 64c of lock section 64. Furthermore, in order to allow convex section 71 to be engaged with concave section 72 even when some dislocation is caused therebetween when cover 60 is moved from the standing posture to the lie-down posture, convex section 71 preferably has a convex curved surface and concave section 72 preferably has a concave curved surface. Convex section 71 and concave section 72 also may be formed to have a cylindrical or prismatic shape. In this embodiment, convex section 71 is provided in inner section 62 and concave section 72 is provided in collar section 13 of casing 10. Since collar section 13 can be formed to have a fixed thickness, collar section 13 can be prevented from having a reduced thickness even at a portion at which concave section 72 is formed. Alternatively, an opposite shape also may be used where convex section 71 is provided in collar section 13 of casing 10 and concave section 72 is provided in inner section 62.

Furthermore, the tip end of outer section 61 has hook 61a that is locked to collar section 13 of casing 10 when the cover is closed. Hinge 80 connects the base end section of outer section 61 of cover 60 (the right end of outer section 61 in the drawings) and collar section 12 at which uneven section 14 of casing 10 is provided. As shown in FIG. 1, the surface of outer section 61 forms, when the cover is closed, a continuous plane that is continued from the surface of body case 4 fixedly adhered to casing 10 such that outer section 61 is abutted body case 4. This can consequently prevent a situation where the cover is caught by a hand to hinder operations.

Hinge 80 has long hole 81 that is formed in fixing section 82 fixed to collar section 12 of casing 10 in the same direction as that along which outer section 61 is slid. Shaft 83 is moved within long hole 81. Shaft 83 is fixed to a base end section of outer section 61. Both sides of the base end section of outer section 61 have notch 84 to which fixing section 82 of hinge 80 is inserted.

The following section will describe how to use the battery receiving mechanism in the first embodiment having the configuration as described above. When the cover is closed as shown in FIG. 1, cover 60 has the lie-down posture. Hook 61a provided in cover 60 is locked to collar section 13 of casing 10. Convex section 71 and concave section 72 of engagement section 70 provided at inner section 62 of cover 60 and collar section 13 of casing 10 are engaged to each other. Protrusion section 64a of inner section 62 of cover 60 is engaged with small dent section 64b closer to the tip end of outer section 61 of cover 60. In this status, terminal 63 fixed to inner section 62 of cover 60 is abutted to electrode 1a of battery 1 received in battery receiving room 2.

Next, outer section 61 of cover 60 is slid to be away from uneven section 14 of casing 10 in order to open cover 60, outer section 61 is slid by a distance equal to the length of long hole 81 within which shaft 83 of hinge 80 is moved and consequently the cover is being opened while having the lie-down posture. In the middle of the opening of the cover as described above, as shown in FIG. 2, hook 61a provided in cover 60 is disengaged from collar section 13 of casing 10 and protrusion section 64a of inner section 62 is engaged with small dent section 64c closer to the base end section of outer section 61. However, since convex section 71 provided in inner section 62 is continuously engaged with concave section 72 provided in collar section 13 of casing 10, inner section 62 is not slid and terminal 63 fixed to inner section 62 is continuously abutted to electrode 1a of battery 1.

Next, when cover 60 is rotated around shaft 83 of hinge 80 as a rotation axis and has the standing posture, cover 60 is opened as shown in FIG. 3. Then, since protrusion section 64a of inner section 62 is continuously engaged with small dent section 64c closer to the base end section of outer section 61, inner section 62 and outer section 61 are prevented from being dislocated from each other.

Thus, when cover 60 is then caused to have the lie-down posture in the middle of the opening of the cover in order to close the cover, as shown in FIG. 2, convex section 71 provided in inner section 62 is inserted to concave section 72 provided in collar section 13 of casing 10 as before. By convex section 71 formed to have a convex curved surface and concave section 72 formed to have a concave curved surface, even when inner section 62 is dislocated to some extent, inner section 62 is guided by the cured face and convex section 71 is securely inserted to concave section 72 and is engaged therewith. Thus, terminal 63 fixed to inner section 62 is abutted to electrode 1a of battery 1 as before.

Then, when outer section 61 is then slid to uneven section 14 of casing 10 in order to completely close the cover, as shown in FIG. 1, protrusion section 64a provided in inner section 62 is engaged in small dent section 64b of outer section 61 and hook 61a provided in cover 60 is locked to collar section 13 of casing 10. Then, convex section 71 of inner section 62 inserted to concave section 72 of casing 10 prevents inner section 62 from being moved together with outer section 61. Thus, terminal 63 fixed to inner section 62 is continuously abutted to electrode 1a of battery 1. At this stage, inner section 62 is prevented from being moved and thus is prevented from being rubbed against electrode 1a.

(Embodiment 2)

Figure 4:
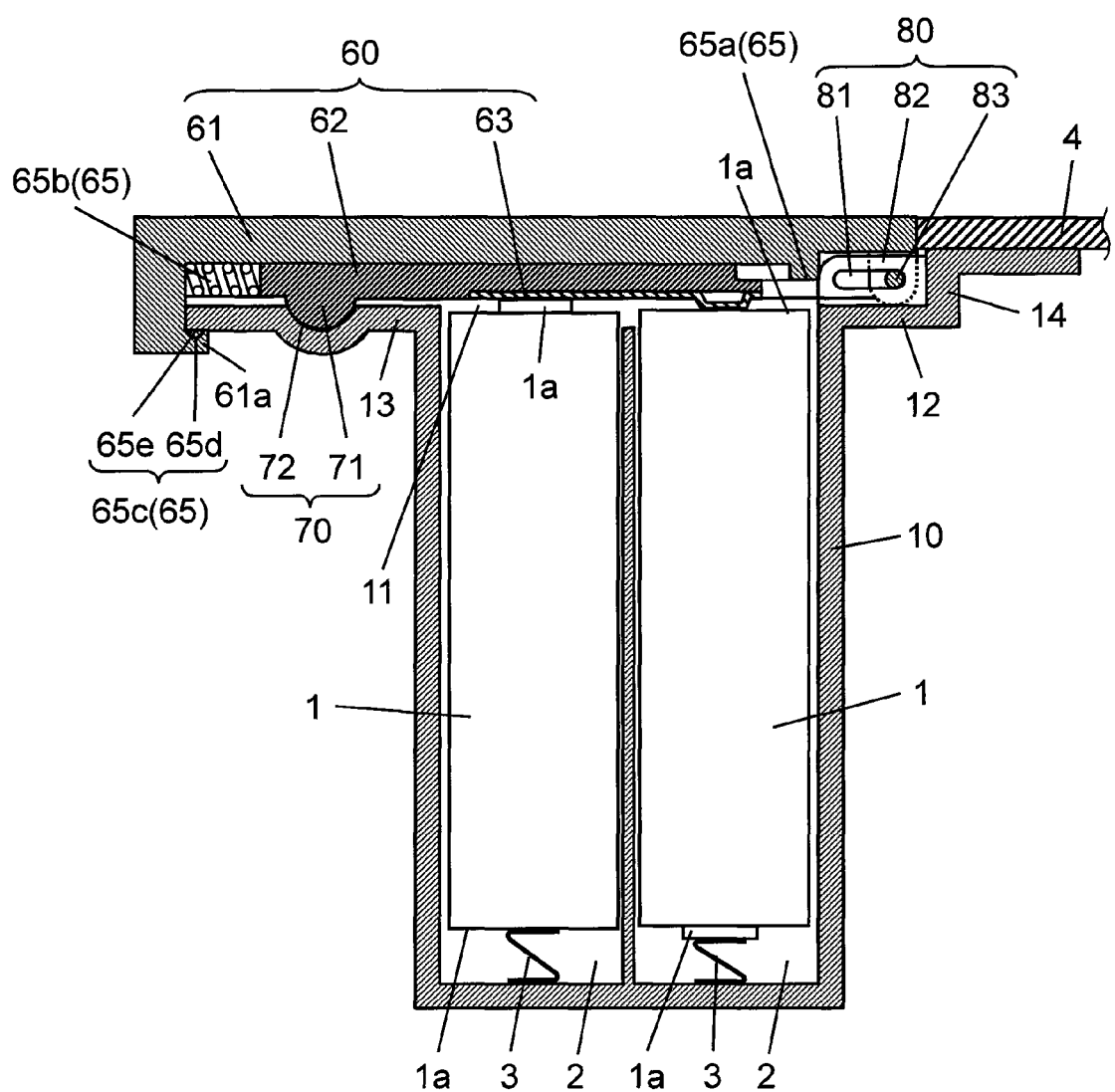
FIG. 4 is a front cross-sectional view illustrating a battery receiving mechanism in Embodiment 2 according to the present invention when the cover is closed.
Figure 5:
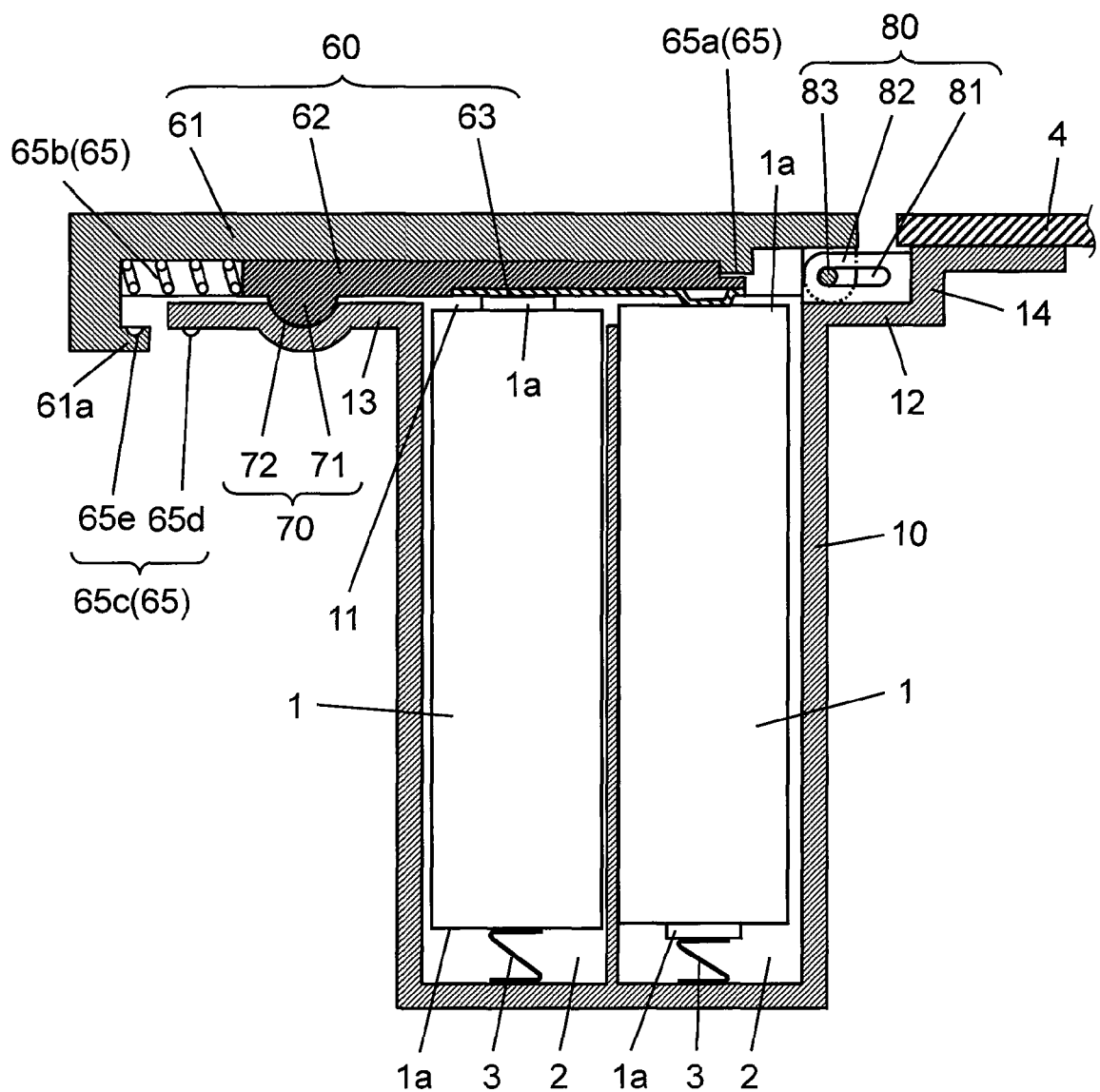
FIG. 5 is a front cross-sectional view illustrating the battery receiving mechanism in Embodiment 2 according to the present invention when the cover is being opened.
Figure 6:
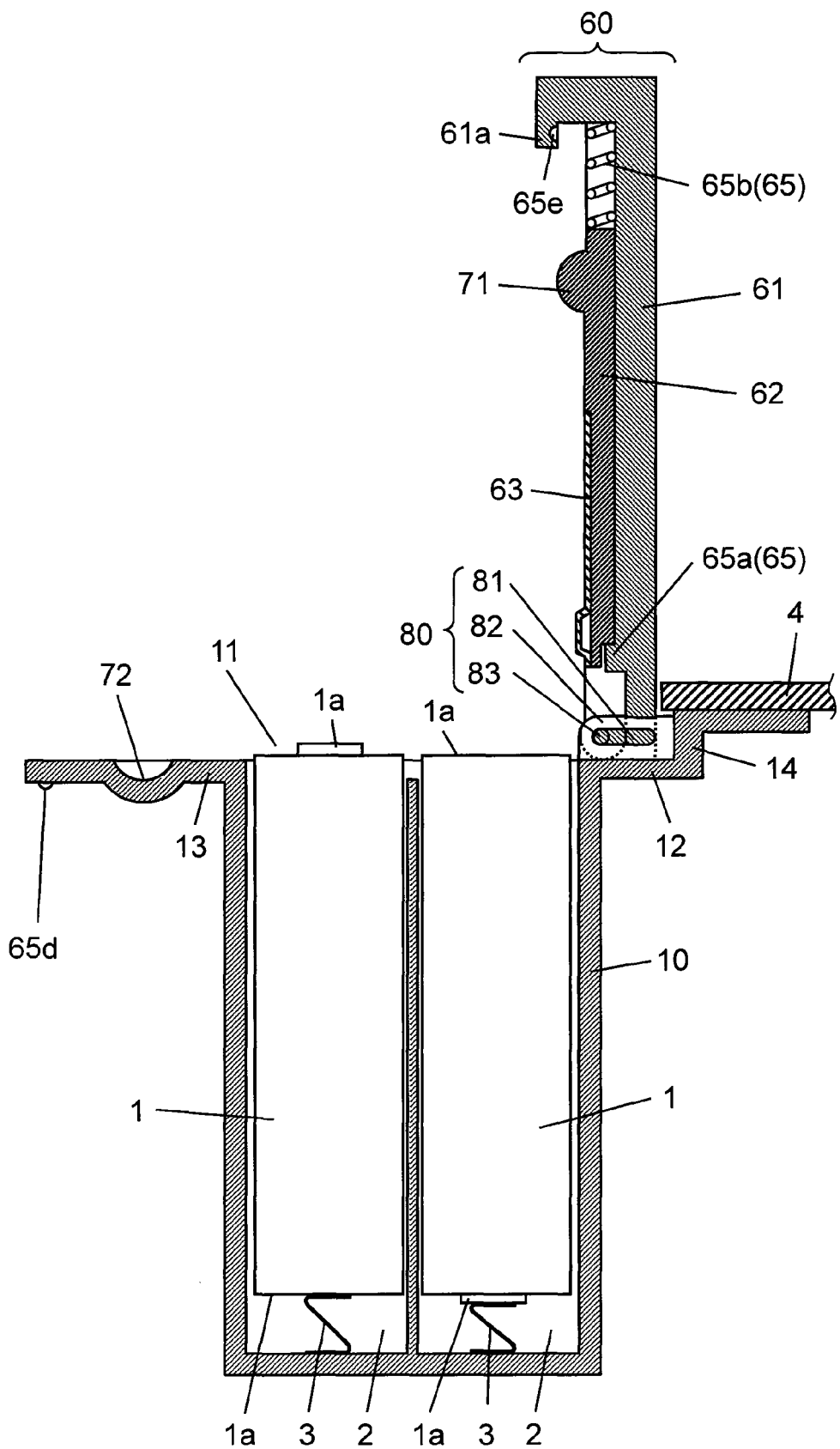
FIG. 6 is a front cross-sectional view illustrating the battery receiving mechanism in Embodiment 2 according to the present invention when the cover is opened.
Figure 7:
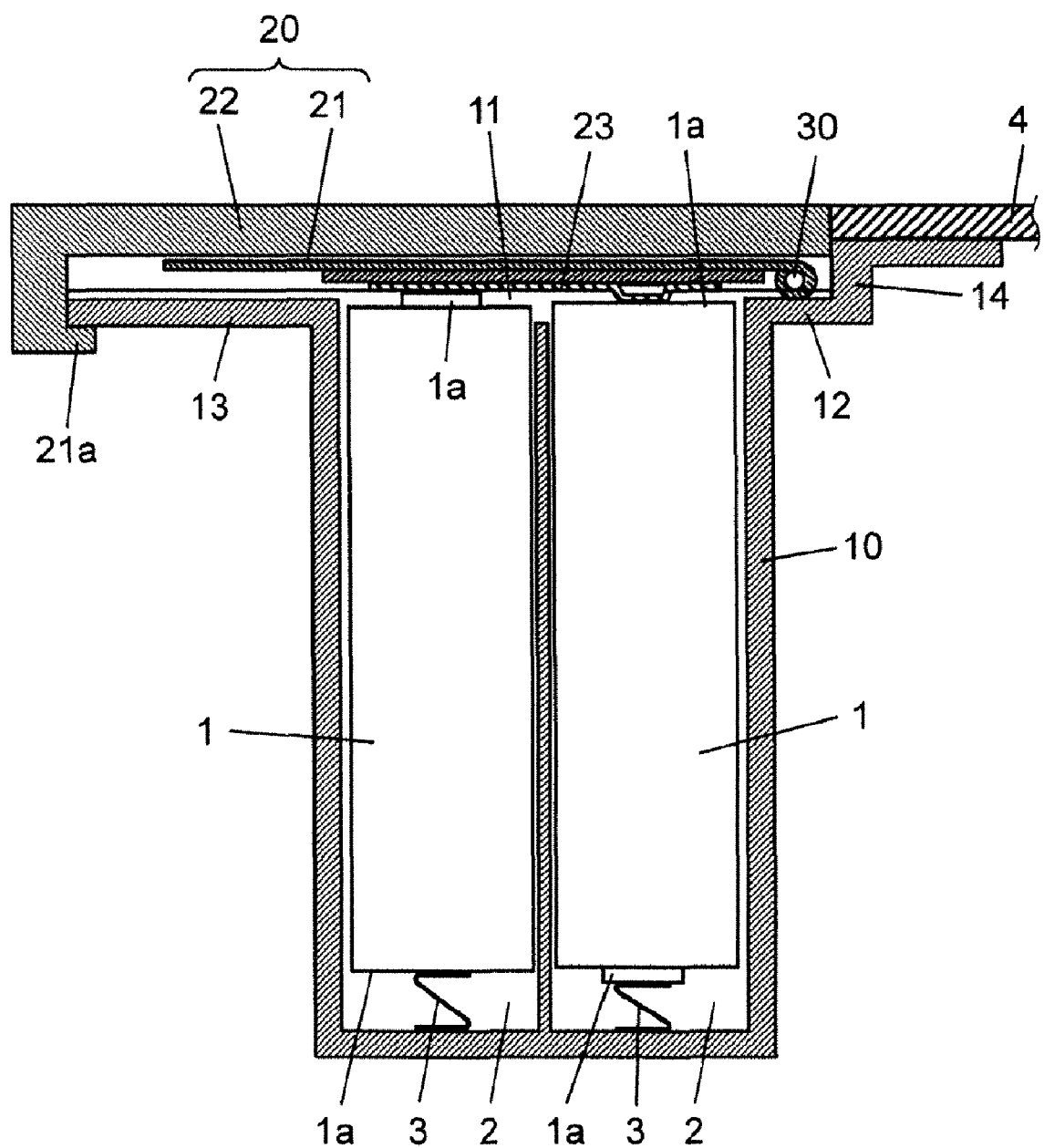
FIG. 7 is a front cross-sectional view illustrating a battery receiving mechanism of the first conventional example when the cover is closed.
Figure 8:
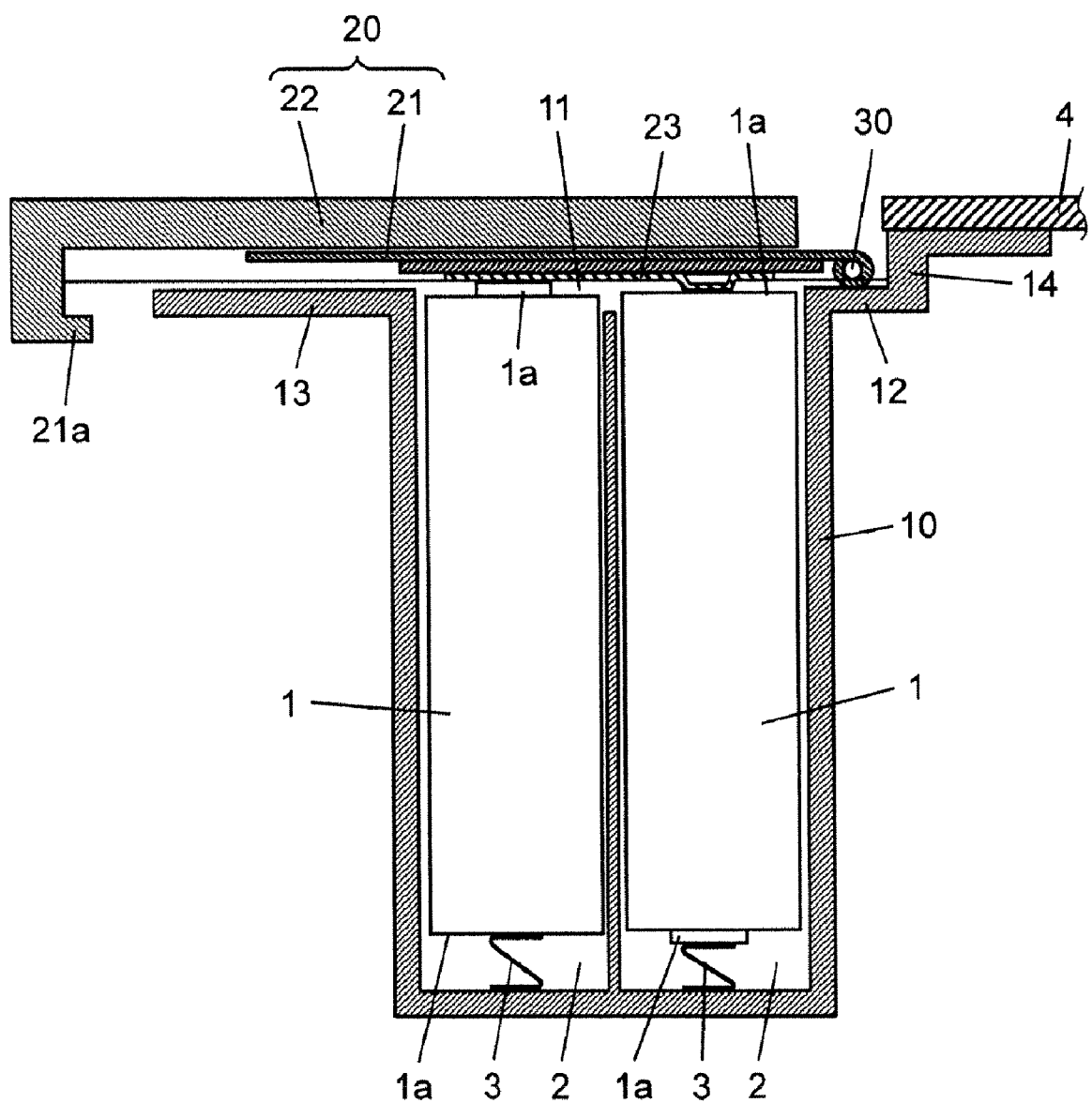
FIG. 8 is a front cross-sectional view illustrating the battery receiving mechanism of the first conventional example when the cover is being opened.
Figure 9:
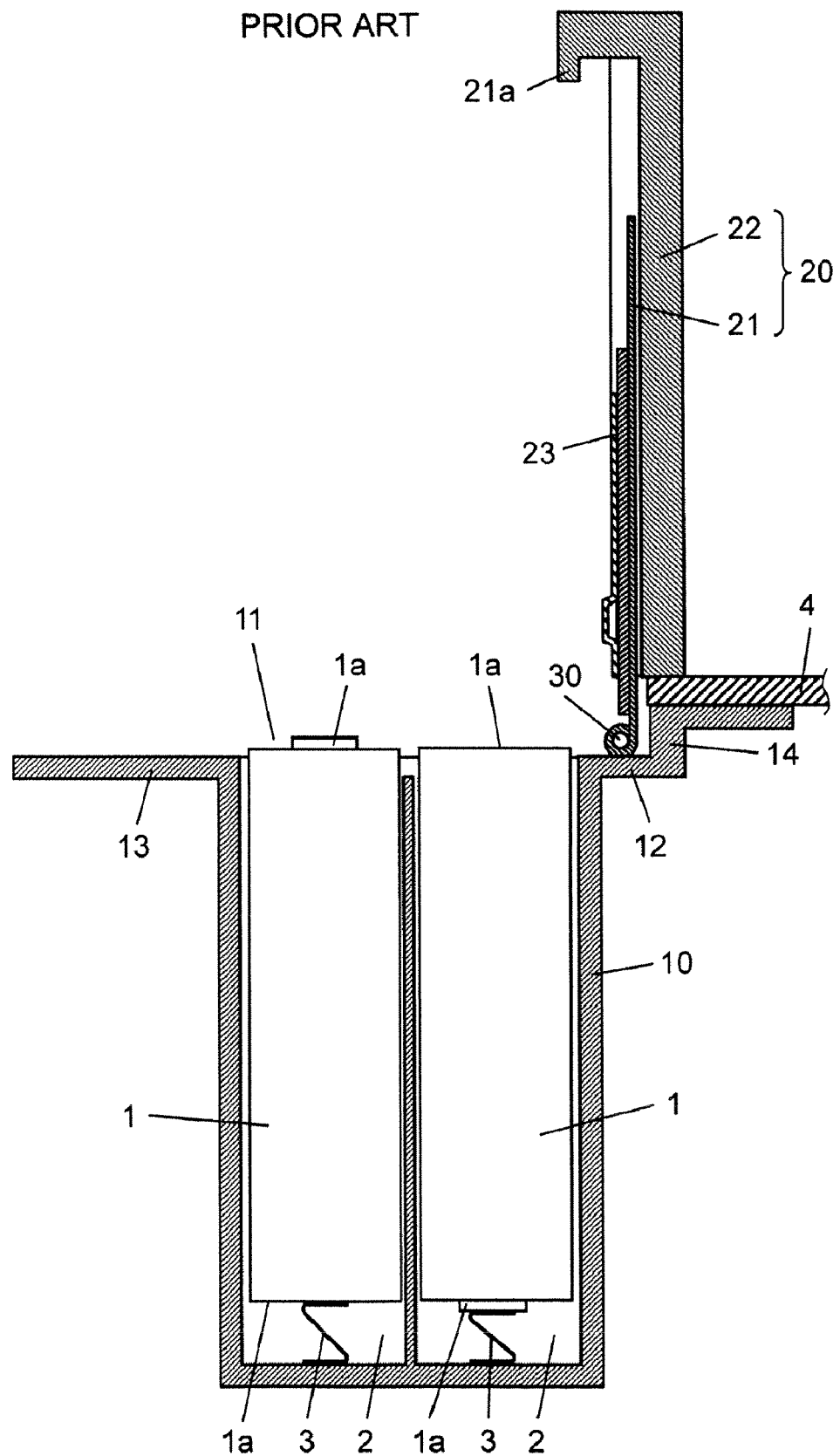
FIG. 9 is a front cross-sectional view illustrating the battery receiving mechanism in the first conventional example when the cover is opened.
Figure 10:
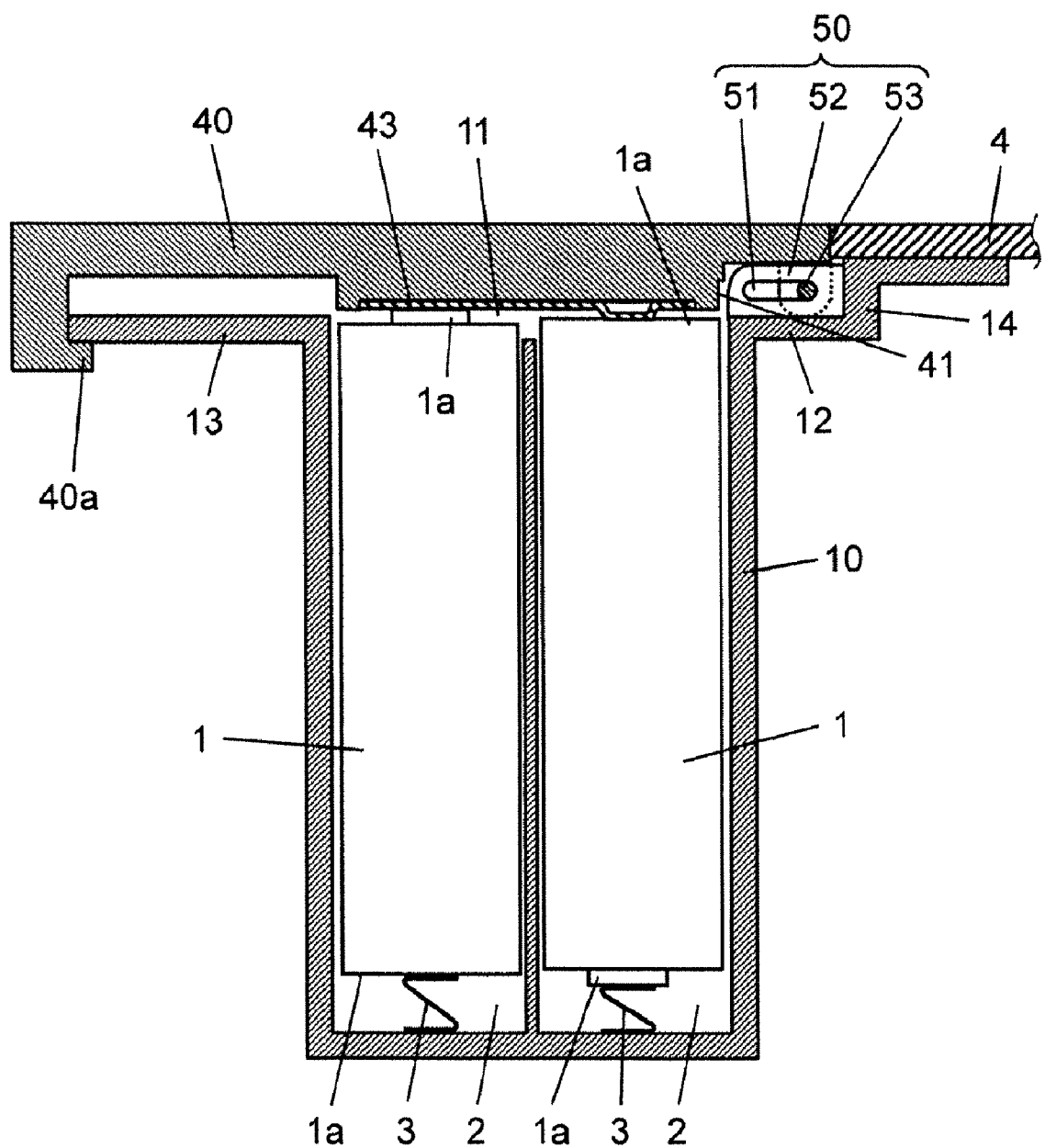
FIG. 10 is a front cross-sectional view illustrating the battery receiving mechanism in the second conventional example when the cover is closed.
Figure 11:
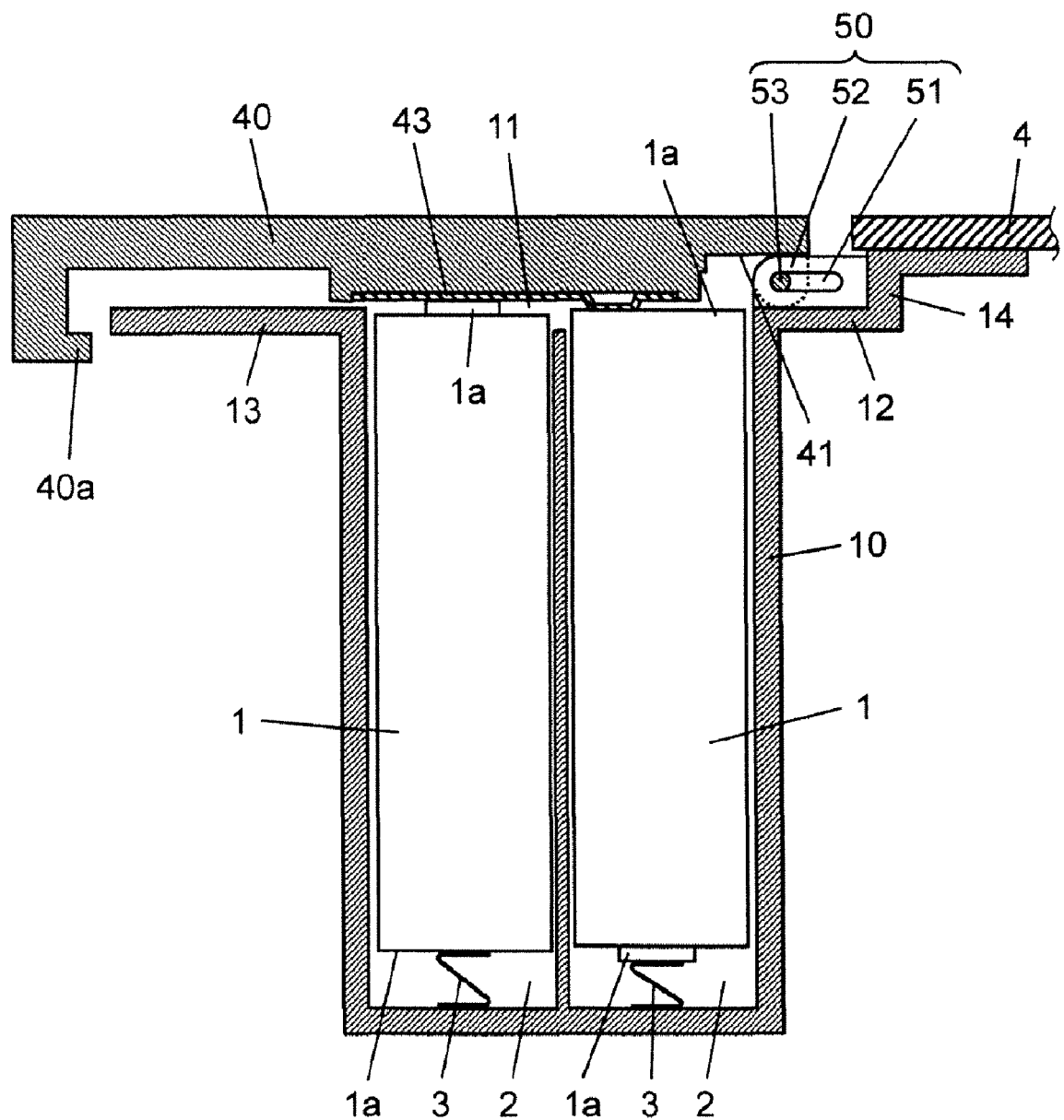
FIG. 11 is a front cross-sectional view illustrating the battery receiving mechanism in the second conventional example when the cover is being opened.
Figure 12:
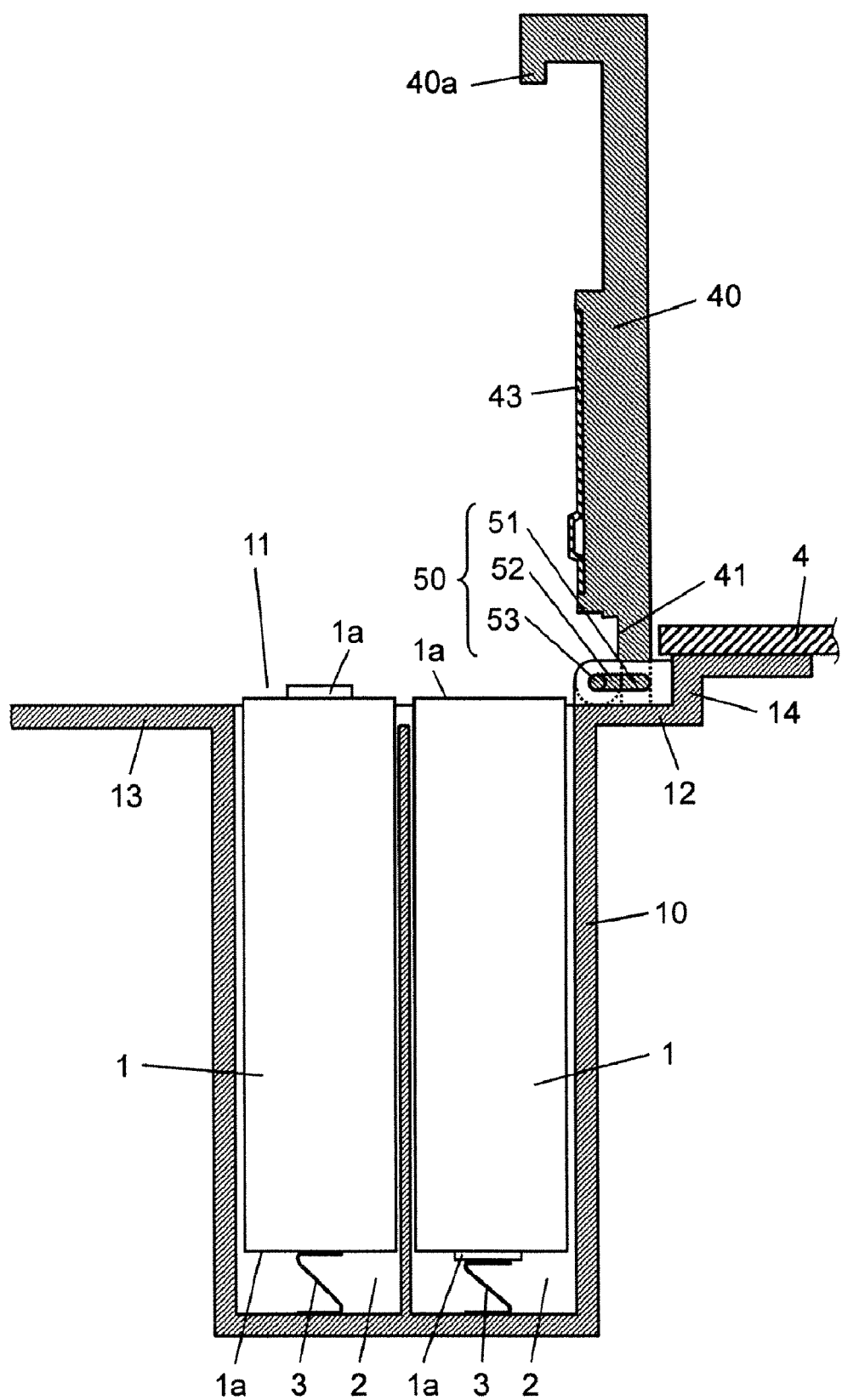
FIG. 12 is a front cross-sectional view illustrating the battery receiving mechanism in the second conventional example when the cover is opened.

Next, the following section will describe Embodiment 2 of the battery receiving mechanism according to the present invention with reference to FIG. 4 to FIG. 6. FIG. 4 is a front cross-sectional view illustrating the battery receiving mechanism in Embodiment 2 according to the present invention when the cover is closed. FIG. 5 is a front cross-sectional view illustrating the battery receiving mechanism in Embodiment 2 according to the present invention when the cover is being opened. FIG. 6 is a front cross-sectional view illustrating the battery receiving mechanism in Embodiment 2 according to the present invention when the cover is opened. The battery receiving mechanism in Embodiment 2 is obtained by changing lock section 64 in Embodiment 1. Thus, the same parts are denoted with the same reference numerals and will not be described further.

Lock section 65 in Embodiment 2 includes: projection section 65a provided at the back face of outer section 61 in a protruded manner; biasing member 65b provided at the tip end-side of inner section 62; and retention section 65c for maintaining the cover-closed status against the biasing force of biasing member 65b.

Projection section 65a is provided at the back face of outer section 61 in a protruded so as to be abutted to a base end edge of inner section 62 so that, when the cover is being opened during which outer section 61 is being slid in a direction away from uneven section 14 of casing 10, terminal 63 fixed to inner section 62 is continuously abutted to electrode 1a of battery 1 as shown in FIG. 5. Biasing member 65b is sandwiched between hook 61a-side end provided in outer section 61 and the tip end of inner section 62. In this embodiment, biasing member 65b is a compression spring. However, biasing member 65b is not limited to a compression spring and also may be composed of a plate spring or rubber for example. Biasing member 65b always biases inner section 62 to projection section 65a. However, an opposite configuration also may be used where biasing member 65b of a tension spring is provided between projection section 65a and hinge 80. Retention section 65c is composed of convex portion 65d and concave portion 65e provided at a face at which hook 61a is opposed to collar section 13 of casing 10. Other sections of engagement section 70 and hinge 80 are the same as those of the first embodiment. Also in this embodiment, the surface of outer section 61 forms, when the cover is closed, a continuous plane that is continued from the surface of body case 4 fixedly adhered to casing 10 such that outer section 61 is abutted body case 4 as shown in FIG. 4. This can consequently prevent a situation where the cover is caught by a hand to hinder operations.

Next, the following section will describe how to use the battery receiving mechanism of this embodiment. When the cover is closed as shown in FIG. 4, cover 60 has the lie-down posture, convex section 71 provided in inner section 62 is engaged with concave section 72 provided in collar section 13 of casing 10, and terminal 63 fixed to inner section 62 is abutted to electrode 1a of battery 1. At the same time, hook 61a provided in cover 60 is locked to collar section 13 of casing 10 and convex portion 65d of retention section 65c is engaged with concave portion 65e. Thus, biasing member 65b presses outer section 61 but outer section 61 is prevented from being slid.

Next, in order to open the cover, a force is given by a hand to cover 60 to slide cover 60 so that outer section 61 of cover 60 is moved away from uneven section 14 of casing 10. Outer section 61 is slid, as shown in FIG. 5, by the pressing force by biasing member 65b by a distance equal to the length of long hole 81 within which shaft 83 of hinge 80 is moved. As a result, the cover is being opened while still having the lie-down posture. In the middle of the opening of the cover as described above, hook 61a provided in cover 60 is disengaged from collar section 13 of casing 10, convex portion 65d is disengaged from concave portion 65e in retention section 65c, biasing member 65b is extended, and the base end edge of inner section 62 is abutted to projection section 65a provided at outer section 61 in a protruded manner. However, since convex section 71 provided in inner section 62 is continuously engaged with concave section 72 provided in collar section 13 of casing 10, terminal 63 fixed to inner section 62 is continuously abutted to electrode 1a of battery 1.

Next, when cover 60 is rotated around shaft 83 of hinge 80 as a rotation axis and has the standing posture, the cover is opened as shown in FIG. 6. Then, inner section 62 is biased by biasing member 65b and the base end edge of inner section 62 is continuously abutted to projection section 65a of outer section 61 and thus inner section 62 and outer section 61 are prevented from being dislocated from each other.

Thus, when cover 60 has the lie-down posture in the middle of the opening of the cover in order to close the cover again, as shown in FIG. 5, convex section 71 provided in inner section 62 is inserted to concave section 72 provided in collar section 13 of casing 10 as before. By convex section 71 formed to have a convex curved surface and concave section 72 formed to have a concave curved surface, even when inner section 62 is dislocated to some extent, inner section 62 is guided by the curved face and convex section 71 is securely inserted to concave section 72. Thus, terminal 63 fixed to inner section 62 is abutted to electrode 1a of battery 1 as before.

Then, when outer section 61 is slid to uneven section 14 of casing 10 in order to completely close the cover, as shown in FIG. 4, hook 61a provided in cover 60 is locked to collar section 13 of casing 10 and convex portion 65d is engaged with concave portion 65e in retention section 65c and thus biasing member 65b is continuously compressed. At this stage, inner section 62 is prevented from being moved and thus is prevented from being rubbed against electrode 1a.

The present invention is not limited to the above embodiments and various changes can be made within the scope of invention-specifying matters according to the claims. For example, the first embodiment also may be changed so that outer section 61 has a projection section that is abutted to or moved away from base end section-side edge of inner section 62 (which corresponds to projection section 65a in the second embodiment). Alternatively, the second embodiment also may be changed so that retention section 65c is provided at the position of lock section 64 in the first embodiment. Alternatively, casing 10 also may not include collar section 12 or 13.

Although hinge section 80 has been described as having long hole 81 as a bearing in the embodiment, the bearing is not limited to the long hole-like shape. Specifically, the bearing may have any shape so long as the bearing can receive the shaft slid in a direction along which outer section 61 is slid. For example, a U-like shape for receiving the shaft also may be used other than a hole.

Although the above embodiment has been described as having the shaft provided at outer section 61-side, an opposite configuration also may be used where the shaft is fixed to casing 10-side and the bearing is provided at outer section 61-side.

Furthermore, as shown in FIG. 1 and FIG. 4, the surface of outer section 61 forms, when the cover is closed, a continuous plane that is continued from the surface of body case 4 fixedly adhered to casing 10 such that outer section 61 is abutted body case 4. This can consequently prevent a situation where the cover is caught by a hand to hinder operations. As described above, the cover structure for smoothly connecting outer section 61 to body case 4 has used, as described by way of the conventional example, the sliding of a long stroke, a terminal rubbed against an electrode, and a high-cost stainless steel terminal for example. However, these disadvantages are solved by the present invention. The stroke is reduced because the structural relation between the cover and the hinge shown in the second conventional example is used. Furthermore, the existence of the engagement section prevents the electrode of a battery from being rubbed.

Industrial Applicability

The battery receiving mechanism according to the present invention can be effectively used to constitute a battery receiving room provided in a camera or a click on type strobe apparatus (so-called single strobe apparatus), a mobile electronic device such as a mobile audio device, and an electronic device such as a desktop clock.

The invention claimed is:

1. A battery receiving mechanism, comprising:
    a casing having a battery receiving room, one end of the casing having an opening section for exposing an electrode of a battery;
    a cover by which the opening section is opened and closed; and
    a hinge by which the casing is connected to the cover, wherein:
    the cover includes an outer section and an inner section that are superposed to each other and that are slidable relative to each other,
    the inner section is abutted to the electrode of the battery,
    the outer section is connected to the hinge,
    the hinge includes a shaft and a bearing and the bearing allows the shaft to be slid in a direction along which the cover is slid, and
    the battery receiving mechanism includes an engagement section for engaging the inner section with the casing when the cover is closed.

2. The battery receiving mechanism according to claim 1, further comprising a lock section for temporarily fixing the inner section to the outer section.

3. The battery receiving mechanism according to claim 2, wherein:
    the lock section is a combination of a protrusion section and a dent section that are engaged to each other or disengaged from each other when the outer section is slid,
    one face of opposed faces of the outer section and the inner section includes the protrusion section, and
    the other face of the opposed faces includes the dent section.

4. The battery receiving mechanism according to claim 1, further comprising:
    a biasing member in a direction along which the outer section is slid; and
    a retention section for maintaining a cover-closed status against a biasing force of the biasing member.

5. The battery receiving mechanism according to claim 1, wherein:
    the engagement section is a combination of a convex section and a concave section,
    one face of opposed faces of the inner section and the casing includes the convex section and the other face of the opposed faces of includes the concave section.

6. The battery receiving mechanism according to claim 1, wherein:
    the outer section includes a hook that is locked to the casing when the cover is closed.

7. The battery receiving mechanism according to claim 1, wherein:
    a surface of the outer section forms, when the cover is closed, a continuous plane that is continued from a surface of a body case fixedly adhered to the casing such that the outer section is abutted the body case.

* * * * *